E. RIECKE.
SYSTEM OF TRANSMISSION.
APPLICATION FILED MAR. 20, 1908.
925,385.
Patented June 15, 1909.
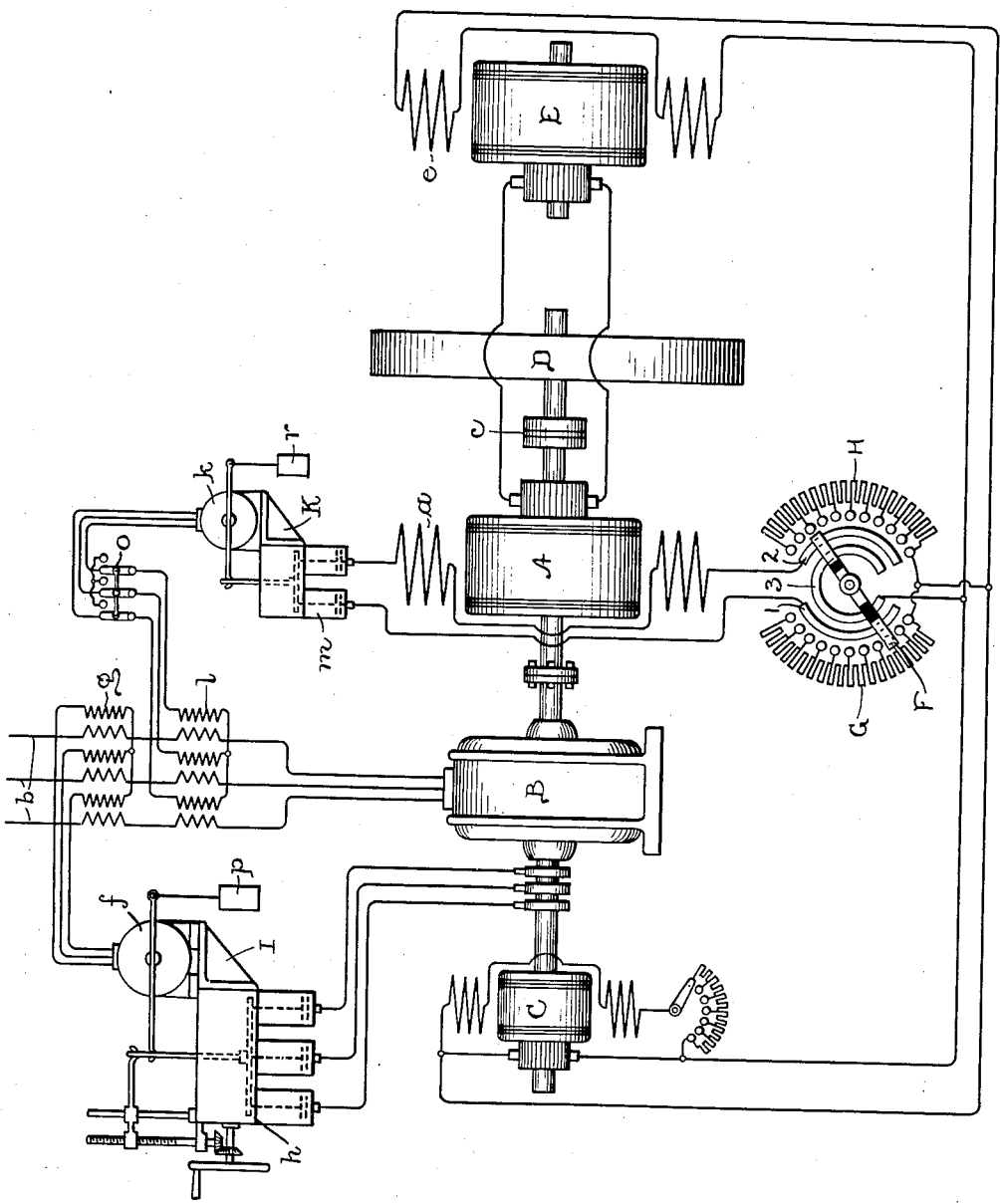
Witnesses
J. Ellis Glen
J. Earl Ryan
Inventor
Ernst Riecke
by [signature]
Atty.

UNITED STATES PATENT OFFICE.

ERNST RIECKE, OF BERLIN, GERMANY, ASSIGNOR TO GENERAL ELECTRIC COMPANY, A CORPORATION OF NEW YORK.

SYSTEM OF TRANSMISSION.

No. 925,385.

Specification of Letters Patent.

Patented June 15, 1909.

Application filed March 20, 1908. Serial No. 422,282.

*To all whom it may concern:*

Be it known that I, ERNST RIECKE, a subject of the King of Prussia, residing at Berlin, Germany, have invented certain new and useful Improvements in Systems of Transmission, of which the following is a specification.

My invention relates to transmission systems, and more particularly to such systems of transmission for mill or similar motors which are subject to severe overloads, and has for its object the limiting of the power intake of the fly-wheel motor-generator or the like, which supplies the current for these motors.

Heretofore, in operating such systems, an excessive current is often supplied the motor of the fly-wheel motor-generator when excessive overloads are thrown upon the mill motor which continue for such a period that the fly-wheel slows down and can give up no more energy. By my invention the taking of such an excessive current by the motor of the fly-wheel motor-generator is prevented.
This I accomplish by automatically decreasing the voltage of the generator when the motor of the fly-wheel motor-generator is excessively loaded due to the continuance of an overload on the mill motor.
For a better understanding of my invention and the advantages possessed by it, reference may be had to the following description taken in connection with the accompanying drawing.
The single figure shows diagrammatically a transmission system arranged in accordance with my invention in which the voltage of the generator is decreased by an automatic rheostat operated by the current flowing in the supply mains of the motor of the motor-generator when the driving motor is heavily overloaded.

In the drawing, A represents the armature and *a* the field of a separately excited generator. This generator is driven by any suitable means as an induction motor B, supplied from the alternating current mains *b*.

C represents a separate exciter which may consist of any suitable source of current as, for instance, of a small generator mounted on the shaft of the induction motor B, as shown.

D represents a fly-wheel which is coupled to the shaft of the generator A by means of a coupling *c*.

E represents the armature of a motor supplied with current from the armature A of the generator, and *e* represents the field of the motor supplied with constant excitation from the exciter C.

F represents the control switch which is arranged to connect the generator field *a* to the exciter C to vary the current supplied to the generator field. It is arranged so as to reverse the current through this field and to cut either of the variable resistances G or H therein depending upon the direction of the current flowing through the field *a*.

I represents an automatic rheostat or slip-regulator, which is arranged to cut resistance into or out of the rotor circuit of the induction motor B. This slip-regulator consists of a slip-regulating or "torque" motor *f* supplied with current from a series transformer *g* which is inserted in the alternating current mains *b*, and of a water rheostat *h*, the plates of which are separated or brought together by the slight motion of the motor *f*. This torque motor does not rotate but simply exerts a torque and is similar in its action to a solenoid.

A similar device K operates to cut resistance into or out of the main generator field *a*. This device also consists of a motor *k*, similar to the motor *f*, supplied with current from a series transformer *l*, and a water rheostat *m* which is normally short-circuited. A switch *o* may also be inserted in the circuit of the motor *k*.

In the drawing the switch F is shown in operative position for one direction of rotation. In this position it will be noticed that a circuit is made from the exciter C, through the resistance G, control switch F, contact 1, water-rheostat *m*, generator field *a*, contacts 2 and 3 to the other terminal of the exciter. By moving the switch F, more or less of the resistance G is placed in the field circuit. Starting from the vertical or "off" position and moving the switch arm in either direction, the field circuit is closed through the whole of the resistance G or H, depending upon the direction of rotation desired of the motor E. If moved in the opposite direction from that shown in the drawing, the same circuit connections would have been made except the resistance H would have been cut into the field circuit, and the current through the field *a* and, consequently, the generator voltage would have been reversed.

The current taken from the alternating current mains by the motor of the fly-wheel motor generator is prevented from exceeding a certain amount by means of the slip-regulating device I. When the induction motor B is lightly loaded, the torque of the motor *f* and the weight *p* just balance the weight of the blades of the rheostat *h*. This rheostat is practically short-circuited in this position. As the load is increased the current taken by the motor B and the current transformed by the series transformer *g* is proportionally increased as is the torque of the motor *f*. As this torque increases the blades of the rheostat are separated in order to maintain the balance. This separation of the blades of the rheostat inserts resistance in the rotor circuit of the induction motor B and tends to slow it down, thereby permitting the fly-wheel D to give up some of its stored energy. This condition maintains only as long as, during the period of maximum load, the slip-regulating device I continues to operate to decrease the speed of the induction motor B. When the slip-regulator can decrease the speed no more, an excessive load will be taken from the mains *b*.

To prevent the motor B from taking an excessive load from the mains when the motor E is heavily loaded and the slip regulator I can decrease the speed no more, the device K is provided, which operates in a similar manner to that of the slip regulator I to cut resistance into the field *a* of the generator. The device K has its weight so proportioned that it will not operate until after the regulator I can decrease the speed of motor B no more. By this means, the potential of the generator A and consequently the speed of the motor E is decreased. The efficiency of the hoist or mill, the power input to the motor B and the power output of the generator A are affected by this arrangement in such a manner that the supply of current to the motor B does not exceed a certain amount.

The device K may be cut out of the circuit by means of a switch *o*, which at the same time short-circuits the transformer *l*, when an excessive overload on the motor E is not to be feared.

Further, I desire it to be understood that my invention is not limited to the specific arrangement of circuits shown and described, and I aim in the appended claims to cover all modifications which do not depart from the spirit of my invention.

What I claim as new and desire to secure by Letters Patent of the United States is,—

1. In a system of transmission, a source of current supplying a motor, a generator coupled to a fly-wheel, driven by said motor and supplying current to a second motor, means for decreasing the speed of the first mentioned motor when said second motor is excessively loaded, and means responsive to the load on the system for automatically inserting resistance in the generator field to limit the power input to said first mentioned motor.

2. In combination, a source of current supplying a motor, a generator coupled to a fly-wheel and driven by said motor, means operated by the flow of current to said motor for decreasing its speed, and means for automatically inserting a resistance into the generator field in order to limit the power input to said motor.

3. In combination, a source of current supplying a motor, a generator coupled to a fly-wheel and driven by said motor, means operated by the flow of current to said motor for decreasing its speed, and means actuated by the flow of current to said motor for automatically inserting resistance into the generator field in order to limit the power input to said motor.

4. In combination, a source of alternating current supplying an induction motor, said motor driving a separately excited generator coupled to a fly-wheel, means operated by the flow of current to said motor for inserting resistance into the rotor circuit of said motor, and a second means actuated by the flow of current to said motor for automatically limiting the power input to said motor.

5. In combination, a source of alternating current supplying an induction motor, said motor driving a separately excited generator coupled to a fly-wheel, means operated by the flow of current to said motor for inserting resistance into the rotor circuit of said motor, and a second means actuated by the flow of current to said motor for automatically inserting resistance into the generator field thereby limiting the power input to said motor.

In witness whereof, I have hereunto set my hand this fifth day of March, 1908.

ERNST RIECKE.

Witnesses:
JULIUS RUMLAND,
OSKAR SINGER.